US008756309B2

(12) United States Patent
Machida

(10) Patent No.: US 8,756,309 B2
(45) Date of Patent: Jun. 17, 2014

(54) RESOURCE INFORMATION COLLECTING DEVICE, RESOURCE INFORMATION COLLECTING METHOD, PROGRAM, AND COLLECTION SCHEDULE GENERATING DEVICE

(75) Inventor: Fumio Machida, Tokyo (JP)

(73) Assignee: Nec Corporation, Tokyo (JP)

( * ) Notice: Subject to any disclaimer, the term of this patent is extended or adjusted under 35 U.S.C. 154(b) by 756 days.

(21) Appl. No.: 12/513,224

(22) PCT Filed: Nov. 8, 2007

(86) PCT No.: PCT/JP2007/071582
§ 371 (c)(1),
(2), (4) Date: May 1, 2009

(87) PCT Pub. No.: WO2008/056682
PCT Pub. Date: May 15, 2008

(65) Prior Publication Data
US 2010/0083263 A1    Apr. 1, 2010

(30) Foreign Application Priority Data
Nov. 6, 2006    (JP) .................................. 2006-300201

(51) Int. Cl.
*G06F 15/173*    (2006.01)
(52) U.S. Cl.
USPC ......................................... 709/224; 705/7.38
(58) Field of Classification Search
USPC .......................................................... 709/224
See application file for complete search history.

(56) References Cited

U.S. PATENT DOCUMENTS

2007/0005755 A1* 1/2007 Humphries .................. 709/224
2008/0097801 A1* 4/2008 MacLellan et al. ............... 705/7

FOREIGN PATENT DOCUMENTS

| JP | 2000047912 A | 2/2000 |
| JP | 2001022612 A | 1/2001 |
| JP | 2001306511 A | 11/2001 |
| JP | 2004145636 A | 5/2004 |
| JP | 2004178118 A | 6/2004 |
| JP | 2004206495 A | 7/2004 |
| JP | 2005250521 A | 9/2005 |
| JP | 2005352965 A | 12/2005 |
| WO | 2006046486 A | 5/2006 |

OTHER PUBLICATIONS

International. Search Report for PCT/JP2007/071582 mailed Dec. 11, 2007.

* cited by examiner

*Primary Examiner* — Hua Fan

(57) ABSTRACT

A condition storage unit (40) retains generation conditions including requested freshness of resource information serving as a collection target and a polling time interval. A collection schedule generating unit (10) sorts the pieces of resource information, which has the same value as an update interval derived from the requested freshness, into a same group, generates collection schedules for the groups respectively, the collection schedules are of the resource information belonging to the groups, and stores them in a collection schedule storage unit (50). An information collecting unit (20) collects the pieces of resource information in accordance with the generated collection schedules and stores the information in an information storage unit (60).

5 Claims, 14 Drawing Sheets

FIG. 2
410  REQUESTED FRESHNESS OF RESOURCE INFORMATION
| IDENTIFIER OF RESOURCE INFORMATION r_i | INFROMATION FRESHNESS | |
|---|---|---|
| | SMALLEST VALUE lower(r_i) | LARGEST VALUE upper(r_i) |
| | | |
| | | |
| ⋮ | ⋮ | ⋮ |
420
| CONCURRENT UPDATE PROCESSING NUMBER MCU |
|---|
| |
430
| POLLING TIME INTERVAL PI |
|---|
| |

510 COLLECTION SCHEDULE

| IDENTIFIER OF RESOURCE INFORMATION r_i | UPDATE INTERVAL PC VALUE (IntervalPC(r_i)) | NEXT PC VALUE (NextPC(r_i)) |
|---|---|---|
|  |  |  |
|  |  |  |
| ⋮ | ⋮ | ⋮ |

| IDENTIFIER OF RESOURCE INFORMATION r_i | VALUE |
|---|---|
|  |  |
|  |  |
| ⋮ | ⋮ |

FIG. 8

| RESOURCE INFORMATION | Interval PC | NextPC |
|---|---|---|
| resource01 | 3 | 1 |
| resource02 | 3 | 2 |
| resource03 | 3 | 3 |
| resource04 | 5 | 1 |
| resource05 | 5 | 2 |
| resource06 | 5 | 3 |
| resource07 | 7 | 1 |
| resource08 | 7 | 2 |
| resource09 | 7 | 3 |

RESOURCE INFORMATION COLLECTING DEVICE, RESOURCE INFORMATION COLLECTING METHOD, PROGRAM, AND COLLECTION SCHEDULE GENERATING DEVICE

This application is the National Phase of PCT/JP2007/071582, filed Nov. 6, 2007, which claims priority based on Japanese Patent Application No. 2006-300201 filed on Nov. 6, 2006, and the disclosure thereof is expressly incorporated herein in its entirety.

TECHNICAL FIELD

The present invention relates to a resource information collecting device, a resource information collecting method, a program, and a collection schedule generating device which enable collection of resource information by an optimal collection schedule when information about various resources (resource information) is to be collected from calculators distributed over a wide area, etc.

BACKGROUND ART

Along with advancement of distribution and complexity of information systems, increase of the system operation management cost has become a problem. Therefore, in order to improve efficiency of system operation management, an operation management system which collects and stores the information (resource information) about various resources of calculators and network devices etc. serving as management targets and carries out operations and control of the system based on the stored resource information is provided. For example, Patent Literature 1 describes an example of the operation management system in which network systems and Web systems serve as monitoring target systems, resource information is collected from the monitoring target systems, stored, and compared with performance deterioration conditions, thereby automatically detecting performance deterioration phenomena.

Since the resource information may be varied, new one have to be kept collecting. If old resource information is used, operations or control of the system may be carried out based on wrong judgement. In order to collect the latest resource information, in the operation management system described in Patent Literature 1, resource information is periodically collected at an interval which is specified in advance.

In the case of a large scale information system, if all resource information is collected at the same time, there is a problem that load is applied to a network or a management system. An example of a conventional technique for solving this problem is described in Patent Literature 2.

In Patent Literature 2, resource information is grouped by the types such as host information, network device setting information, and band allocation information, an update (collection) interval and an upper limit of the concurrent update (collection) number are set for each of the groups, and a collection schedule is generated for each of the groups so that the concurrent update number of the resource information is equal to or less than the upper limit of the concurrent update number.

Patent Literature 1: Unexamined Japanese Patent Application KOKAI Publication No. 2004-145536
Patent Literature 2: International Publication WO2006/046486A1

DISCLOSURE OF INVENTION

According to the above described techniques described in Patent Literature 2, resource information can be collected at update intervals, which are determined in advance, while avoiding convergence of collection. However, since the upper limit of the concurrent update number is set for each type of the resources and the collection schedules are generated respectively for the types of the resources, the number of pieces of collected resource information is largely varied, and room for improvement is still remaining about minimization of the largest concurrent update number.

The present invention has been accomplished in view of the foregoing circumstances, and it is an object to provide a resource information collecting device and a method thereof capable of collecting resource information at required update intervals and reducing the collection load as much as possible.

It is also an object of the present invention to provide a collection schedule generating device which generates a collection schedule which enables collection of resource information at required update intervals and reduction of collection load as much as possible.

A resource information collecting device according to a first aspect of the present invention for achieving the above described objects is a resource information collecting device of periodically collecting plural pieces of resource information by polling, the resource information collecting device is characterized by having a collection schedule generating means sorting the pieces of resource information, which are periodically collected at a same time interval, into a same group and generating a collection schedule for the groups respectively, the collection schedules are of the pieces of resource information belonging to the groups;

a collection schedule storage means storing the pieces of collection schedule generated by the collection schedule generating means;

a resource information collecting means collecting the pieces of resource information in accordance with the collection schedule stored by the collection schedule storage means; and a resource information storage means storing the pieces of resource information collected by the resource information collecting means.

It is permissible that the collection schedule generating means determines whether a largest value of the number of pieces of resource information collected in one polling is exceeding a predetermined number or not when the pieces of resource information are collected in accordance with the generated collection schedule, and stops generation of the collection schedule when the largest number is determined to be exceeding the predetermined number.

It is permissible that, when the pieces of resource information are $r\_i (i=1, 2, \ldots n)$, a time interval of activating a collection process of the resource information $r\_i$ by polling is P1, a number of activation of the polling is PC, a PC value of next collection is $NextPC(r\_i)$, and a PC value corresponding to the time interval of the collection for repeating collection is $IntervalPC(r\_i)$;

the collection schedule generating means generates a set of $NextPC(r\_i)$ and $IntervalPC(r\_i)$ as the collection schedule of the resource information $r\_i$ so that the number of pieces of resource information collected in one polling does not exceed a predetermined number.

It is permissible that the collection schedule generating means attaches serial label values p to the pieces of resource information $r\_i$ belonging to each group and calculates a remainder, which is obtained by dividing the label value p by IntervalPC(r_i) of the group, as NextPC(r_i) of the resource information r_i having the label value p.

It is permissible that the time intervals of collection that the resource information can have are restricted so that the values of the number of times of activation of polling corresponding to the time intervals of periodically collecting the pieces of resource information belonging to each group are relatively prime.

It is permissible that the value of the number of activation of polling corresponding to the time interval of periodically collecting the pieces of resource information is a prime number.

It is permissible that the collection schedule generating means generates collection schedules sequentially from the group having a small time interval of collecting the pieces of resource information and utilizes empty space, which is generated in the collection schedule generated for the group to which the resource information collected at a time interval corresponding to the number k of activation of polling belongs, as the collection schedule of the group to which the resource information collected at a time interval corresponding to the number of activation of polling which is an integral multiple of k belongs.

It is permissible that a condition input means of inputting a collection schedule generation condition including a range of a time interval of collection requested for each piece of resource information serving as a collection target; and a setting means of setting a time interval of periodically collecting the pieces of resource information so as to satisfy the generation condition input by the condition input means.

A resource information collecting method according to a second aspect of the present invention for achieving the above described objects is a resource information collecting method of periodically collecting plural pieces of resource information by polling, the resource information collecting method is characterized by sorting the pieces of resource information, which are periodically collected at a same time interval, into a same group;

generating a collection schedule for the groups respectively, the collection schedules are of the resource information belonging to the groups; and collecting the pieces of resource information in accordance with the generated collection schedule.

A program according to a third aspect of the present invention for achieving the above described objects causes a computer, which periodically collects plural pieces of resource information by polling, to execute a process of sorting the pieces of resource information, which are periodically collected at a same time interval, into a same group;

generating a collection schedule for the groups respectively, the collection schedules are of the resource information belonging to the groups; and collecting the pieces of resource information in accordance with the generated collection schedule.

A collection schedule generating device according to a fourth aspect of the present invention for achieving the above described objects is a collection schedule generating device of generating a collection schedule for periodically collecting plural pieces of resource information by polling, the collection schedule generating device is characterized by having a sorting means sorting the pieces of resource information, which are periodically collected at a same time interval, into a same group; and a collection schedule generating means generating a collection schedule for the groups respectively, the collection schedules are of the resource information belonging to the groups sorted by the sorting means.

Effects of Invention

According to the present invention, the plural pieces of resource information can be collected respectively at the requested update intervals, and the number of pieces resource information collected at one time is reduced as much as possible, thereby reducing collection load as low as possible. The reason therefor is that the collection schedule having small unevenness in the concurrent update processing numbers can be generated by sorting the plural pieces of resource information having the same values of the update intervals into the groups and generating the collection schedules for the groups respectively, the collection schedules are of the resource information belonging to the groups, and the resource information is collected in accordance with the thus-generated collection schedules.

BRIEF DESCRIPTION OF DRAWINGS

FIG. 2 is a diagram showing an example of collection schedule generation conditions;

FIG. 8 is a diagram showing an example of a collection schedule generated by the collection schedule generating unit according to the first example;

FIG. 9 is a diagram showing another example of the collection schedule generated by the collection schedule generating unit according to the first example;

FIG. 15 is an explanatory diagram of a problematic point in the case in which collection schedules are generated for the groups respectively, in which pieces of resource information are sorted by the type thereof.

EXPLANATION OF REFERENCE NUMERALS

1 . . . Resource Information Collecting Device
10 . . . Collection Schedule Generating Unit
20 . . . Information Collecting Unit
30 . . . Search Processing Unit
40 . . . Condition Storage Unit
50 . . . Collection Schedule Storage Unit
60 . . . Information Storage Unit;

BEST MODES FOR CARRYING OUT THE INVENTION

Next, an embodiment of the present invention will be explained in detail with reference to drawings.

A resource information collecting device 1 according to the embodiment of the present invention collects pieces of resource information by a polling process in accordance with a collection schedule at every unit time. Herein, the resource information is the information about resources of calculators and network devices connected to the resource information collecting device 1 and, for example, is information about hardware or software such as a CPU utilization ratio, memory utilization volume, configuration information of devices, and setting information.

Figure 1:
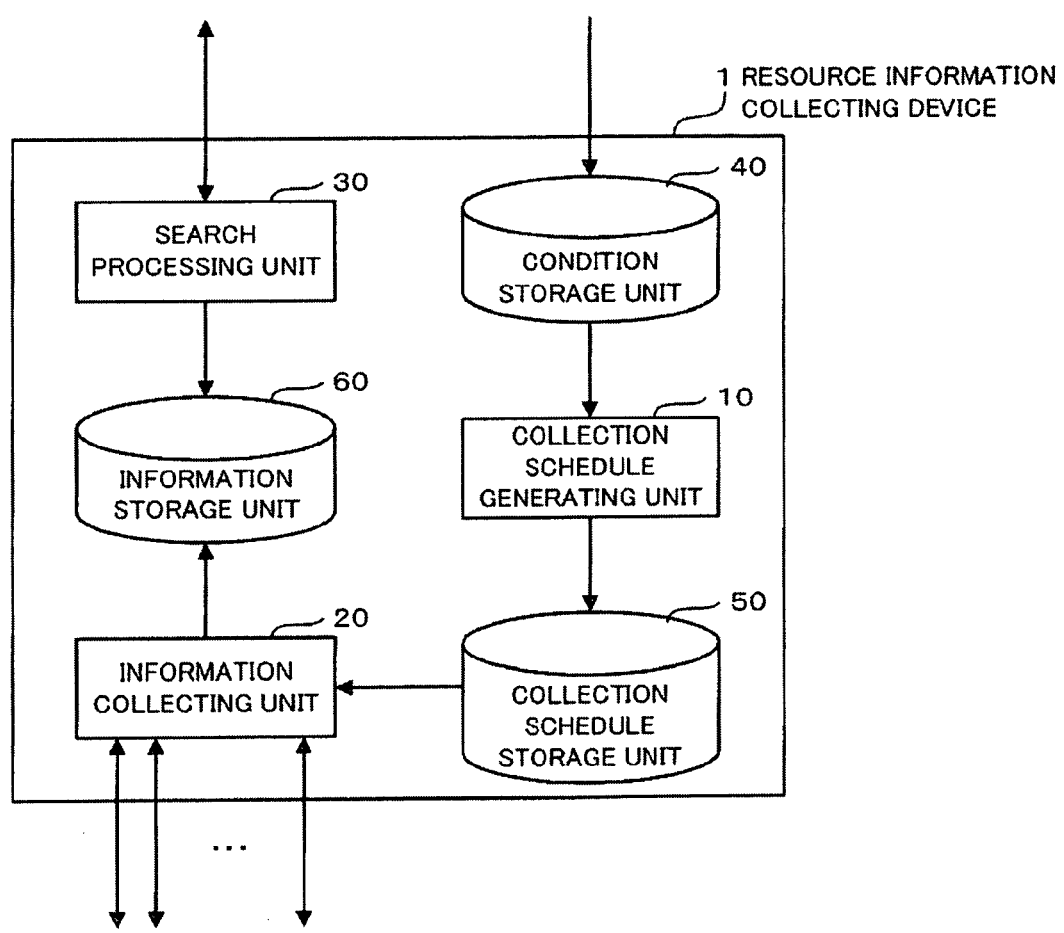
FIG. 1 is a block diagram of a resource information collecting device according to an embodiment of the present invention.

As shown in FIG. 1, the resource information collecting device 1 comprises a collection schedule generating unit 10, an information collecting unit 20, a search processing unit 30, a condition storage unit 40, a collection schedule storage unit 50 and an information storage unit 60.

The condition storage unit 40 stores generation conditions for generating collection schedules. The information that constitutes the generation conditions is, for example, as shown in FIG. 2, requested freshness 410 of the resource information, a concurrent update processing number MCU (Max Concurrent Updates) 420, and a polling time interval PI (Polling Interval) 430.

For each identifier to uniquely identify each resource information $r\_i(1 \leq i \leq n)$, which is serving as a collection target, the requested freshness 410 of the resource information stores the information (a smallest value lower($r\_i$) and a largest value upper($r\_i$) of information freshness) showing the range of the time interval of collecting the resource information $r\_i$ (hereinafter, referred to as information freshness). In other words, the resource information $r\_i$ has to be collected at the information freshness of the range from the smallest value lower($r\_i$) to the largest value upper($r\_i$) of the information freshness stored in the requested freshness 410.

The concurrent update processing number MCU 420 is the information showing an upper limit value of the total number of pieces of the resource information that is collected per one polling.

The polling time interval PI 430 is the information showing the time interval at which a resource information collecting process is activated by polling.

The collection schedule generation conditions are input from the condition storage unit 40 to the collection schedule generating unit 10, and the collection schedule generating unit 10 generates a collection schedule that satisfies the input generation conditions. The collection schedule storage unit 50 stores the generated collection schedule.

Figures 3, 4:
FIG. 3 is a diagram showing an example of the collection schedule.
FIG. 4 is a diagram showing a configuration example of an information storage unit.

An example of the collection schedule 510 is shown in FIG. 3. The collection schedule 510 is the information retaining an update interval PC value (IntervalPC($r\_i$)) and a next PC value (NextPC($r\_i$)) for each identifier of the resource information $r\_i$. The number of activation of polling is considered to be a PC (Polling Count) value, and each of the resource information $r\_i$ is collected in any of the polling processes. Herein, the PC value to be updated (collected) first is defined by the next PC value (NextPC($r\_i$)), and the update interval for repeating update (collection) is defined by the update interval PC value (IntervalPC($r\_i$)).

The information collecting unit 20 collects pieces of resource information in accordance with the collection schedule stored in the collection schedule storage unit 50. As shown in FIG. 4, the information storage unit 60 stores latest values of the collected resource information. In the collection of the resource information, access to calculators or network devices retaining original resource information is made via an unshown network to acquire the information. In a resource information collecting system in which the resource information collecting devices 1 are hierarchized in many levels, copies of the resource information collected by another resource information collecting device may be collected. The information, for example, the resource information is what kind of information about which device and where the acquisition destination is may be stored in the condition storage unit 40 for each piece of resource information or may be separately managed.

The search processing unit 30 searches the information storage unit 60 in accordance with a search request from an unshown search request source specifying the identifier of the resource information $r\_i$ and transmits the value of the corresponding resource information $r\_i$ to the search request source. The search request source is a user terminal in a general case; however, in the resource information collecting system in which the resource information collecting devices 1 are hierarchized in many levels, another resource information collecting device sometimes serves as the search request source.

Next, operations of the resource information collecting device 1 according to the present embodiment will be explained.

Figure 5:
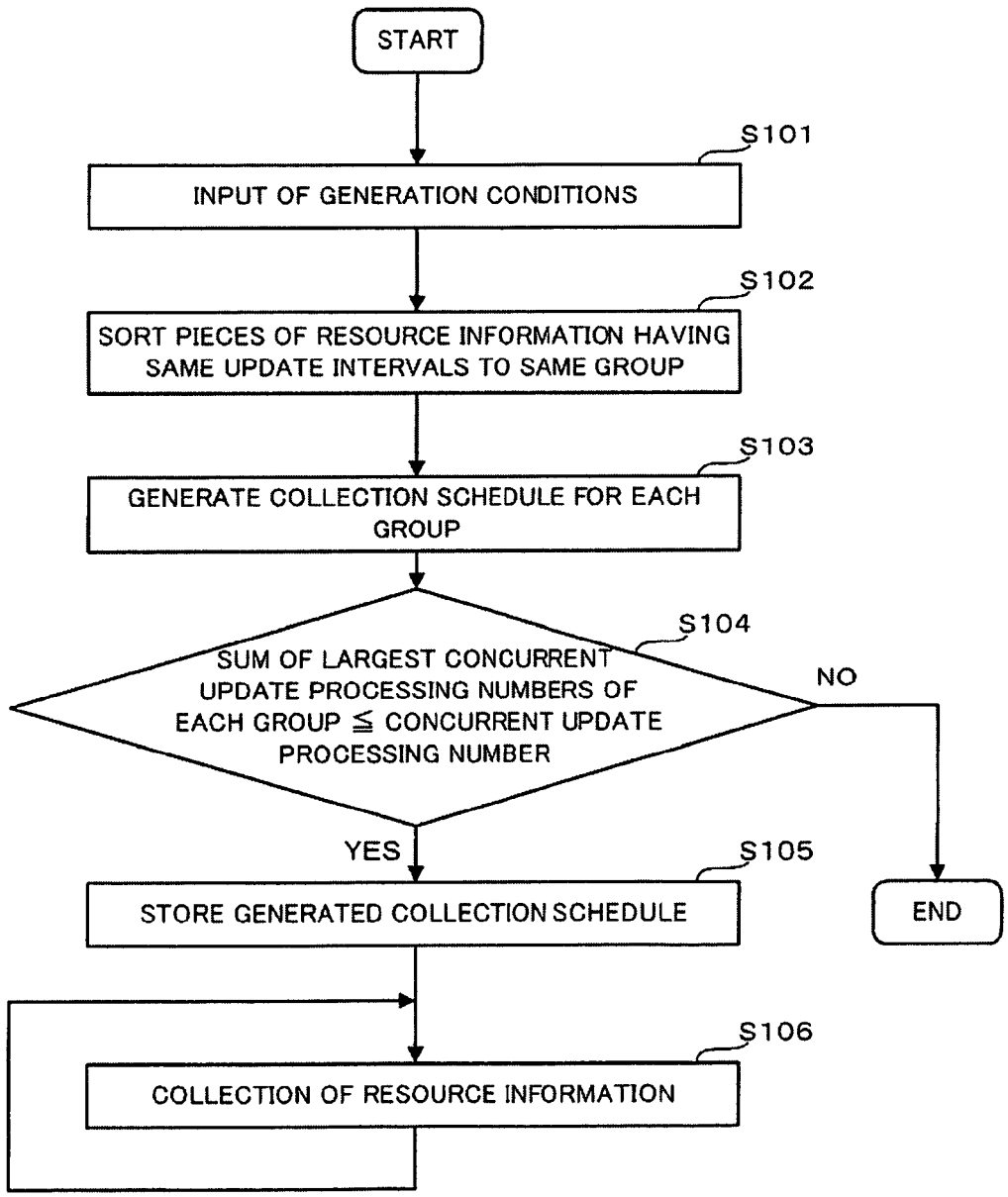
FIG. 5 is a flow chart showing a processing example of the resource information collecting device according to the embodiment of the present invention.

When the requested freshness 410 of the resource information $r\_i$ serving as a collection target, the concurrent update processing number MCU 420, and the polling time interval PI 430 as shown in FIG. 2 are input as the collection schedule generation conditions, for example, from an unshown input device, the resource information collecting device 1 stores them in the condition storage unit 40 (step S101 in FIG. 5).

Next, the collection schedule generating unit 10 reads the generation conditions stored in the condition storage unit 40 and sorts the pieces of resource information having the same value of the update interval, which is derived from the requested freshness, into the same group (step S102). The update interval is an integral multiple of P1 and is obtained from the range from the smallest value lower($r\_i$) or more to the largest value upper($r\_i$) or less of the requested freshness.

Next, the collection schedule generating unit 10 generates a collection schedule, which satisfies the update intervals of the resource information belonging to the group, for each group (step S103).

Next, the collection schedule generating unit 10 checks whether the sum of the largest concurrent update processing numbers of the collection schedules which are generated for the groups respectively, are equal to or less than the concurrent update processing number MCU specified by the generation conditions or not (step S104). If the sum of the largest concurrent update processing numbers of all the groups exceeds the concurrent update processing number MCU, it is determined that the schedule cannot be generated, and the process is finished. At this point, this result may be output from an unshown output device.

On the other hand, if the sum of the largest concurrent update processing numbers of all the groups is equal to or less than the concurrent update processing number MCU, the collection schedule generating unit 10 integrates the generated collection schedules of the respective groups and stores it in the collection schedule storage unit 50 (step S105). After this, the information collecting unit 20 collects pieces of resource information in accordance with the collection schedule stored in the collection schedule storage unit 50 and stores the information in the information storage unit 60 (step S106). In this process, if previously collected values are stored in the information storage unit 60, they are updated to current values.

Figure 6:
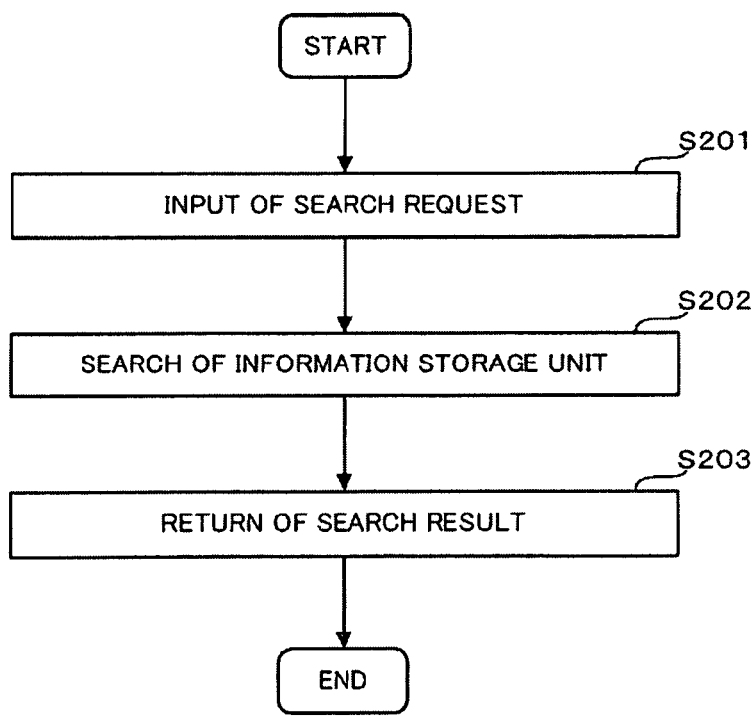
FIG. 6 is a flow chart showing a processing example in the case of a search request of the resource information collecting device according to the embodiment of the present invention.

When a search request is input from an unshown search request source (step S201 in FIG. 6), the resource information collecting device 1 searches the value of the resource information having the identifier specified by the search request from the information storage unit 60 (step S202) and transmits the search result to the request source (step S203). As described above, the value of the resource information stored in the information storage unit 60 is always updated to the latest value at the update interval derived from the requested freshness; therefore, constant information freshness can be ensured for the search request source.

Next, the process of the collection schedule generating unit 10 which is a main characteristic part of the present invention will be explained in detail by using examples.

First Example

Figure 7:
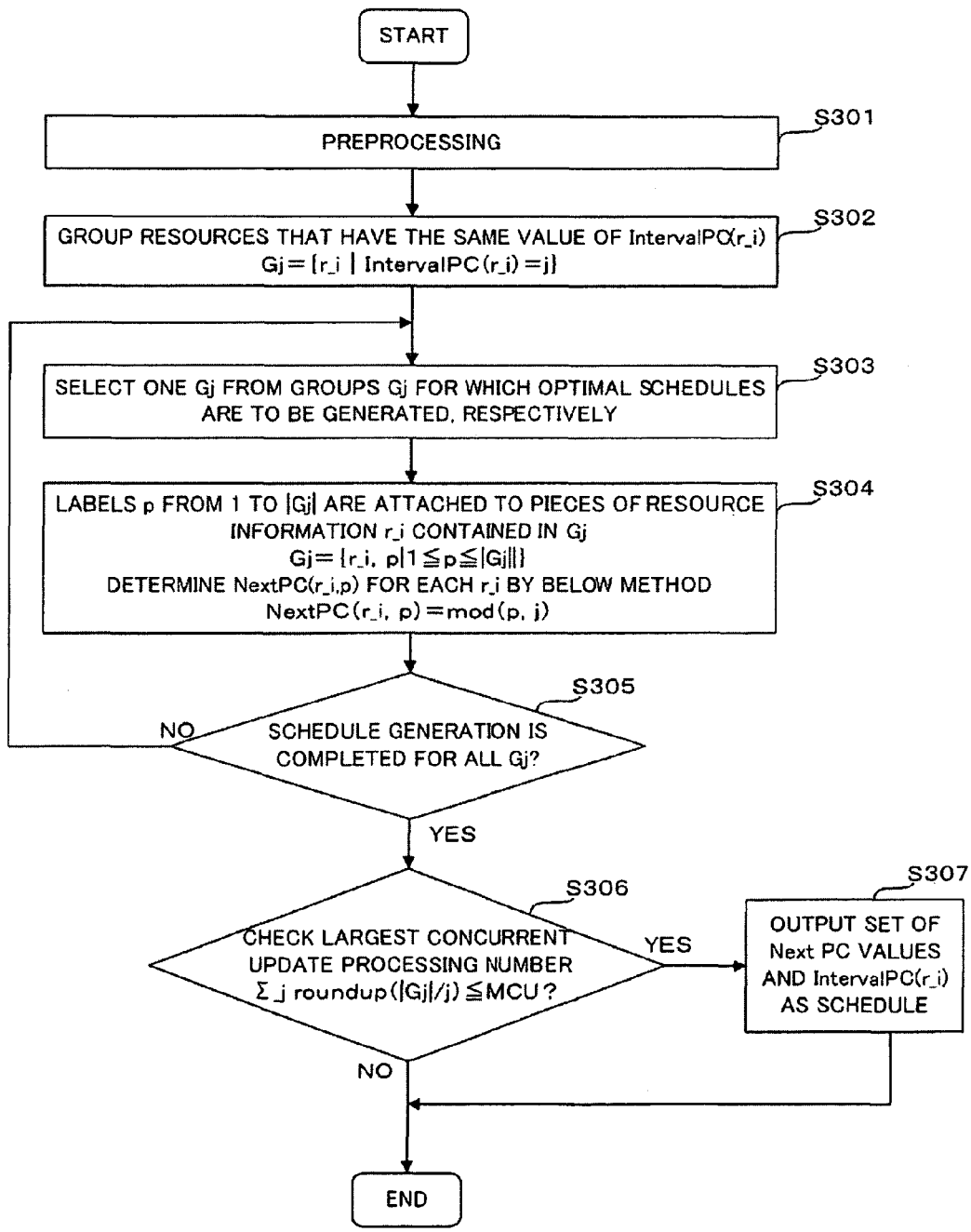
FIG. 7 is a flow chart showing a processing example of a collection schedule generating unit according to a first example.

A process example of the collection schedule generating unit 10 according to the present example is shown in FIG. 7. As a presupposition of the process, it is assumed that the requested freshness 410 of the resource information $r\_i$ serving as a collection target, the concurrent update processing number MCU 420, and the polling time interval PI 430 as shown in FIG. 2 are stored in the condition storage unit 40. The collection schedule generating unit 10 generates an optimal collection schedule which satisfies the information freshness request with respect to the resource information and ensures suppressing collection load to a certain level or less, in other words, the collection schedule generating unit 10 generates the collection schedule (set of $NextPC(r\_i)$ and $IntervalPC(r\_i)$) which causes the largest value of the concurrent update processing number to be small as much as possible. Then, the value of $NextPC(r\_i)$ is updated by adding $IntervalPC(r\_i)$ every time an information collecting process is carried out in accordance with the generated collection schedule ($NextPC(r\_i)=NextPC(r\_i)+IntervalPC(r\_i)$).

[Preprocessing]

First, the collection schedule generating unit 10 carries out preprocessing (step S301). In the preprocessing, first, the collection schedule generating unit 10 obtains and sets $IntervalPC(r\_i)$, which satisfies the information freshness request, with respect to the resources $r\_i$. Then, the collection schedule generating unit 10 obtains the least common multiple LCMI (Least Common Multiple Interval) of $IntervalPC(r\_i)$ set for the resources.

$IntervalPC(r\_i)$ is obtained by the below expression.

$$\forall i\ IntervalPC(r\_i) = \min\{j | j \in Z, lower(r\_i) \leq PI*j \leq upper(r\_i)\} \quad (1)$$

When IntervalPC values are not obtained at this point, it is determined that the schedule cannot be generated, and the process is finished. In this case, a manager of the system has to try the expression by changing PI or $lower(r\_i)$ and $upper(r\_i)$ of the resources.

The method according to the present example is more effective when the resources $r\_i$ can be grouped by the values of $IntervalPC(r\_i)$. Therefore, $IntervalPC(r\_i)$ may be set by either one of the two methods (A) and (B) shown below so that they can be easily grouped.

(A) In the stage of determining $InteralPC(r\_i)$, values are selected so that there are more same values.

Instead of always setting smallest $IntervalPC(r\_i)$ like the above described expression (1), values are set so that the same values are increased as much as possible in consideration of the values of other $intervalPC(r\_i)$.

(B) Profiling

A plurality of profiles each of which specifying the smallest value $lower(r\_i)$ and the largest value $upper(r\_i)$ of the information freshness request in advance are prepared, and all the resources use any of the profiles when $IntervalPC(r\_i)$ is to be obtained. Since the same $IntervalPC(r\_i)$ is set for the resources using the same profile, they are grouped in the profile unit. It takes labor hours to set the smallest value $lower(r\_i)$ and the largest value $upper(r\_i)$ of the information freshness request with respect to individual resource information in an operation management product; therefore, profiling has the effect of reducing the labor hours of management and is practical. The values of $IntervalPC(r\_i)$ determined by the profiles may be prepared to be relatively prime or prime numbers. In that case, more optimal schedules can be generated (the reason therefor will be described later).

The least common multiple LCMI (Least Common Multiple Interval) is obtained by the below expression.

$$LCMI = 1\ cm(Interval(r\_i)) \quad (2)$$

wherein, 1 cm is a function for obtaining the least common multiple.

Since information collecting processes are repeated at the intervals of $IntervalPC(r\_i)$, all the patterns of resource information collection are repetition of the patterns of the range from PC=1 to PC=LCMI. Therefore, $NextPC(r\_i)$ has to be determined so that the concurrent update processing number is equal to or less than the MCU in the range.

Next, the collection schedule generating unit 10 groups the resources having the same value of $IntervalPC(r\_i)$ (step S302). The group grouped by $IntervalPC(r\_i)=j$ is Gj.

$$Gj = \{r\_i | IntervalPC(r\_i) = j\} \quad (3)$$

Next, the collection schedule generating unit 10 generates optimal schedules for each group Gj (steps S303 to S305). First, the collection schedule generating unit 10 selects one group Gj for which an optimal schedule is to be generated (step S303). Next, the collection schedule generating unit 10 attaches labels p having serial numbers from 1 to |Gj| to the pieces of resource information $r\_i$ contained in the selected group Gj.

$$Gj = \{r\_i, p | 1 \leq p \leq |Gj|\} \quad (4)$$

Then, the collection schedule generating unit 10 determines $NextPC(r\_i, p)$ for each resource information $r\_i$ by the below method (step S304).

$$NextPC(r\_i, p) = mod(p, j) \quad (5)$$

wherein, mod is a remainder function.

In this process, the largest concurrent update processing number of the group of Gj is roundup(|Gj|/j). Herein, roundup is a function of rounding up the part after the decimal point.

When generation of the schedules of all Gj is completed (YES in step S305), the collection schedule generating unit 10 generates a final information collection schedule by combining the optimal schedules which are generated for the groups, respectively, calculates the largest concurrent update processing number of the generated information collection schedule, and determines whether the largest concurrent update processing number is equal to or less than the concurrent update processing number MCU 420 or not as shown by the next expression (6) (step S306).

$$\Sigma\_j \text{ roundup}(|Gj|/j) \leq \text{MCU?} \quad (6)$$

When the condition of the above described expression (6) is satisfied (YES in step S306), the collection schedule generating unit 10 outputs the generated schedule, in other words, the set of NextPC(r_i) and IntervalPC(r_i) of the resource information to the collection schedule storage unit 50 and finishes the process (step S307). When the condition of the above described expression (6) is not satisfied (NO in step S306), the collection schedule generating unit 10 determines that the schedule cannot be generated and finishes the process.

Next, effects of the collection schedule generating unit 10 according to the present example will be explained.

In the present example, the pieces of resource information having the same values as IntervalPC(r_i) is sorted to the same group Gj, and a collection schedule is generated for each group Gj. Therefore, compared with the method in which the concurrent update processing number is calculated and subjected to determination with respect to all conceivable set patterns of NextPC(r_i) without carrying out such grouping (full search method), there is the effect that the calculation time for schedule generation can be significantly reduced. Hereinafter, the full search method will be explained, and the effects of the present example will be explained.

Figure 14:
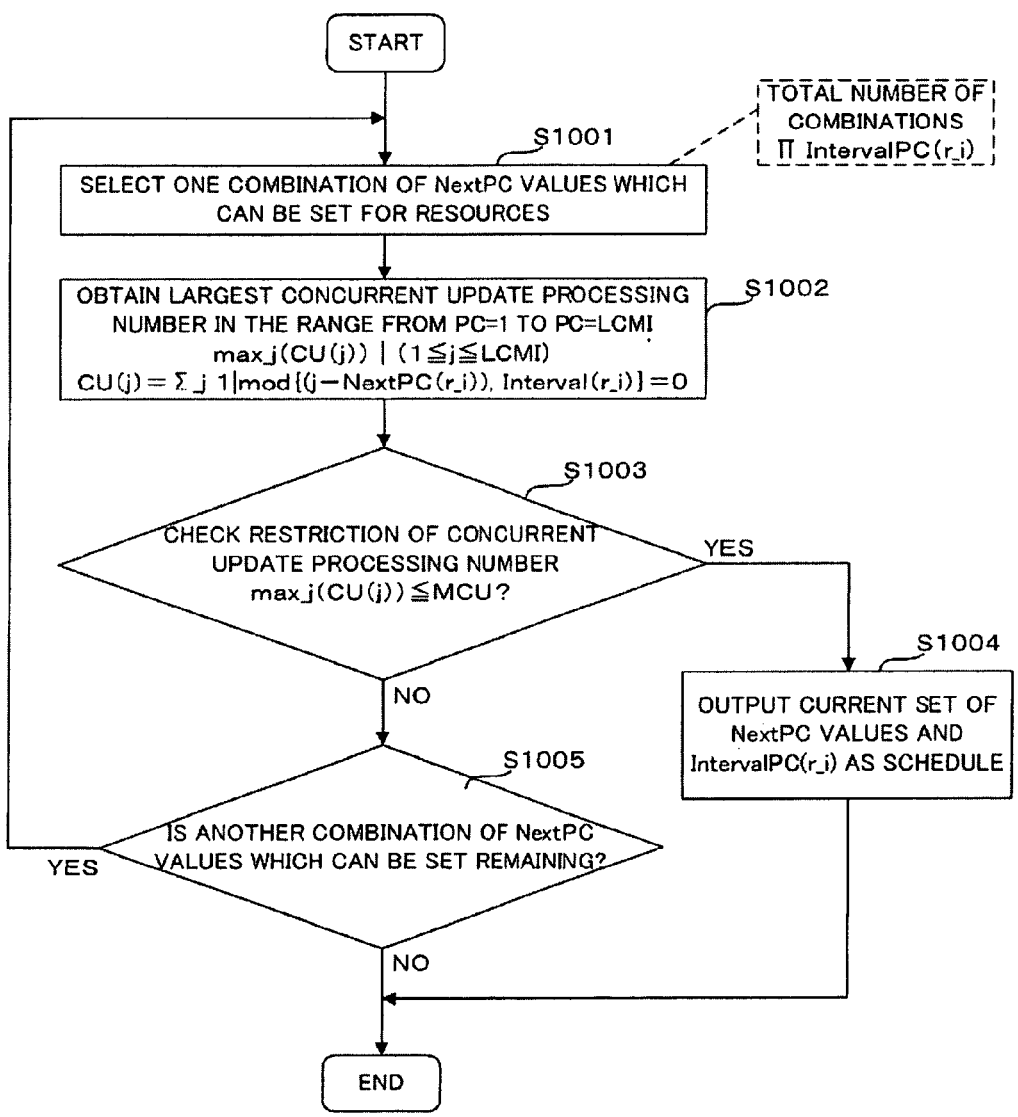
FIG. 14 is a flow chart showing a generation procedure of a collection schedule according to a full search method.

FIG. 14 is a flow chart showing a generation procedure of a collection schedule according to the full search method. It is presupposed that IntervalPC(r_i) and the least common multiple LCMI thereof have already been obtained for each piece of resource information.

In the full search method, first, one of the combinations of NextPC(r_i) which can be set is selected (step S1001). The total number of the combinations is ΠIntervalPC(r_i), in other words, the product of all the IntervalPC(r_i) values. Next, as shown by the below expression, the number of update processes is counted with respect to each PC value, and the value at which the concurrent update processing number is the largest is extracted, thereby obtaining the largest concurrent update processing number in the range from PC=1 to PC=LCMI (step S1002).

$$\max\_j(CU(j))|(1 \leq j \leq \text{LCMI})$$

$$CU(j) = \Sigma\_j 1 | \text{mod } \{(j-\text{NextPC}(r\_i)), \text{Interval}(r\_i)\} = 0 \quad (7)$$

Subsequently, whether the largest concurrent update processing number is equal to or less than the concurrent update processing number MCU 420 or not is determined (step S1003).

$$\max\_j(CU(j)) \leq \text{MCU?} \quad (8)$$

When the condition of the above described expression (8) is satisfied (YES in step S1003), the current set of the NextPC (r_i) values and IntervalPC(r_i) is output as a collection schedule, and the process is finished (step S1004). When the condition of the above described expression (8) is not satisfied (NO in step S1003), whether another combination of NextPC(r_i) which can be set is present or not is determined (step S1005). If it is determined to be present (YES in step S1005), the process returns to step S1001 to repeat the process. If it is determined that it is not present (NO in step S1005), it is determined that the schedule cannot be generated, and the process is finished.

As described above, in the full search method, until the schedule by which the largest concurrent update processing number becomes equal to or less than the concurrent update processing number MCU 420 is finally found, the combinations of ΠIntervalPC(r_i) have to be sequentially examined. Therefore, the calculation time is increased by exponential time with respect to the number i of the resource information. On the other hand, in the method of the present example, by grouping the resources having the same value of IntervalPC (r_i), they can be determined approximately by the linear order of number i of the resource. Comparison using specific examples is described below.

First, an example of the case in which the number of the management target devices is small will be shown, and then, an example of the case in which the number of management target is increased will be shown.

As the example of the case in which the number of the management targets is small, the situation in which resource information has the update interval PC values of 3, 5, and 7, wherein the information of each value includes three pieces of information, is considered. In this case, the method of setting the next update PC values for the resources includes $3^3*5^3*7^3=1157625$ ways. When those having the same update interval PC values are considered to be the same, the redundant numbers are eliminated, and the total number of the combinations becomes 29400 ways ($_3H_3*_5H_3*_7H_3$, wherein redundant combinations are used). In accordance with the combination method, the largest concurrent update processing number may be varied between 3 to 9. Therefore, in order to check whether the restriction of the required concurrent update processing number can be satisfied or not, search has to be sequentially carried out for the 29400 combinations. On the other hand, in the present example, the schedule as shown in FIG. 8 is generated, wherein the concurrent processing number is 3, which is a smallest value.

Next, an example in which the number of resources is increased than the previous example is shown. The situation in which the resource information has the update interval PC values of 3, 5, 7, 11, 17, wherein the information of each value includes 20 pieces of information, is considered. In this case, the method of setting the next update PC values for the resources includes $1.24 \times 10^{29}$ ways or more even when redundancy is taken into consideration (calculated by $_3H_{20}*_5H_{20}*_7H_{20}*_{11}H_{20}*_{17}H_{20}$, wherein redundant combinations are used). In accordance with the combinations, the concurrent update processing number may be varied between 18 to 100. Examining the cases of $1.24 \times 10^{29}$ ways or more to check whether the required concurrent update restriction processing number is satisfied or not is not practical in terms of calculation time and calculation resources. On the other hand, in the present example, the calculation is completed in the number of steps of the integral multiple order of the total resource number 100, and an optimal schedule of the largest concurrent update processing number 18 can be generated.

In the above described examples, since there are not many types of the update interval PC values, the number of combinations is reduced because of redundancy; however, in the case in which the types of the update interval PC values are increased, the total number of combinations is increased more. Therefore, it is difficult to apply approaches such as the full search method to a system having management targets having a scale of thousands of units.

In addition, according to the present example, when the update interval PC values j of the groups Gj are relatively prime (or prime numbers), there is the effect that an optimal schedule can be always generated. The reason therefor is that, when the update interval PC values j of the groups are relatively prime (or prime numbers), regardless of the values of NextPC(r_i), redundancy of update processes (update processes are required at the same PC value) is always exhaustively generated when any two groups thereof are combined. Therefore, the collection schedule by which the total sum (the largest concurrent update processing number of the entirety) of the largest concurrent update processing numbers of the groups is the smallest among conceivable collection schedules.

Furthermore, as disclosed in Patent Literature 2, in the method of setting a concurrent update number for each type of resources and generating a collection schedule for each type of the resources, when the same concurrent update number is set for the resources of a plurality of different types, a plurality of collection schedules of the same concurrent update number are independently generated. Therefore, there is an inclination that many gaps are generated in the collection schedules. On the other hand, in the present example, the resources having the same concurrent update number is integrated into one group to generate a collection schedule. Therefore, there is the effect that the gaps of the collection schedule can be reduced, and a more optimal collection schedule can be generated.

Figure 15:
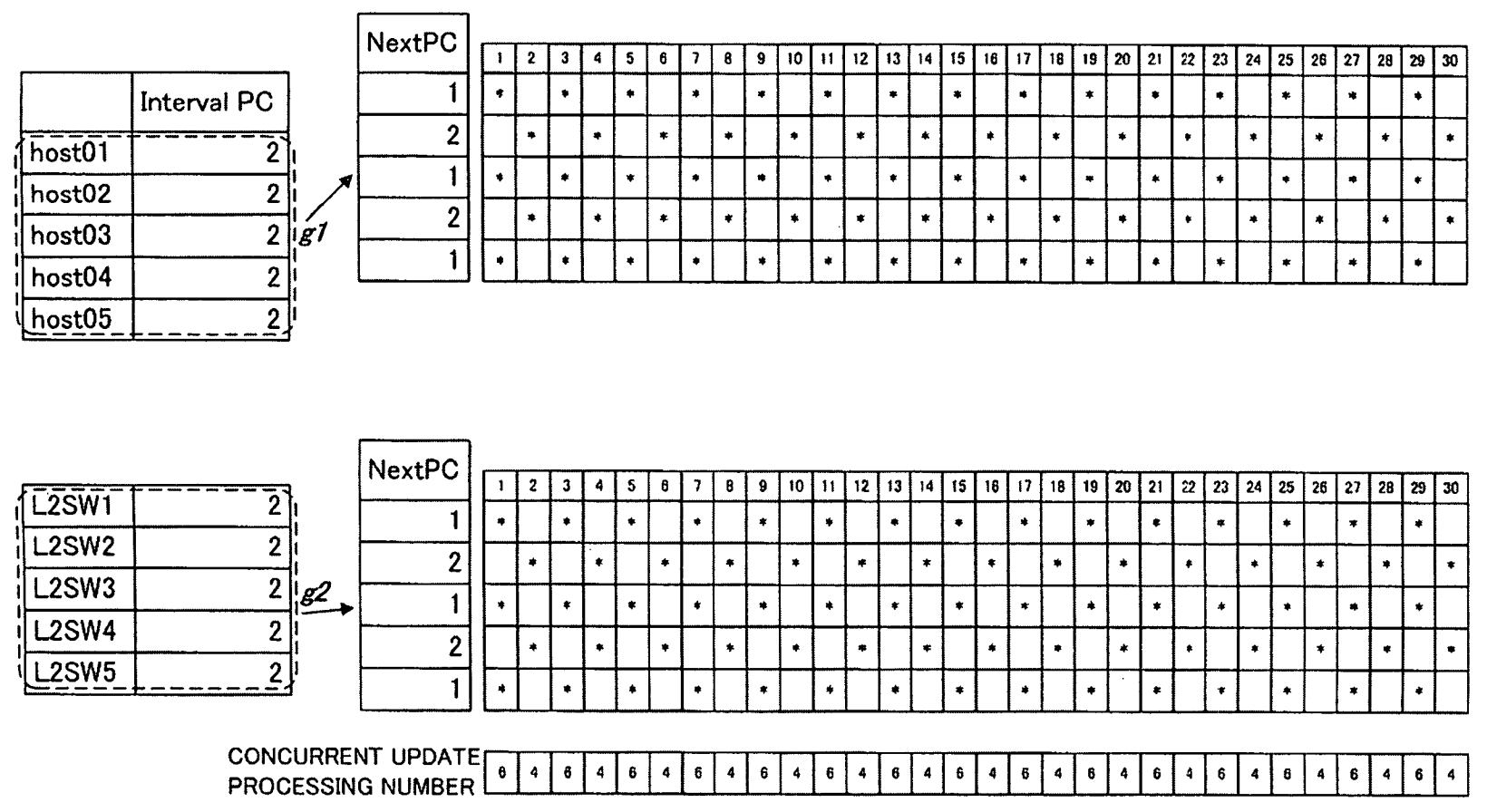

For example, as shown in FIG. 15, it is assumed that there are ten pieces of resource information having the update interval PC value of 2, wherein the pieces of information are separated into two resource groups g1 and g2 when sorted by the type of the resources. In the method of Patent Literature 2, since a collection schedule is independently generated for each group, the two collection schedules as shown in FIG. 15 are generated, and the largest value of the concurrent update processing numbers is 6 as shown in a lower part of FIG. 15.

Figure 9:
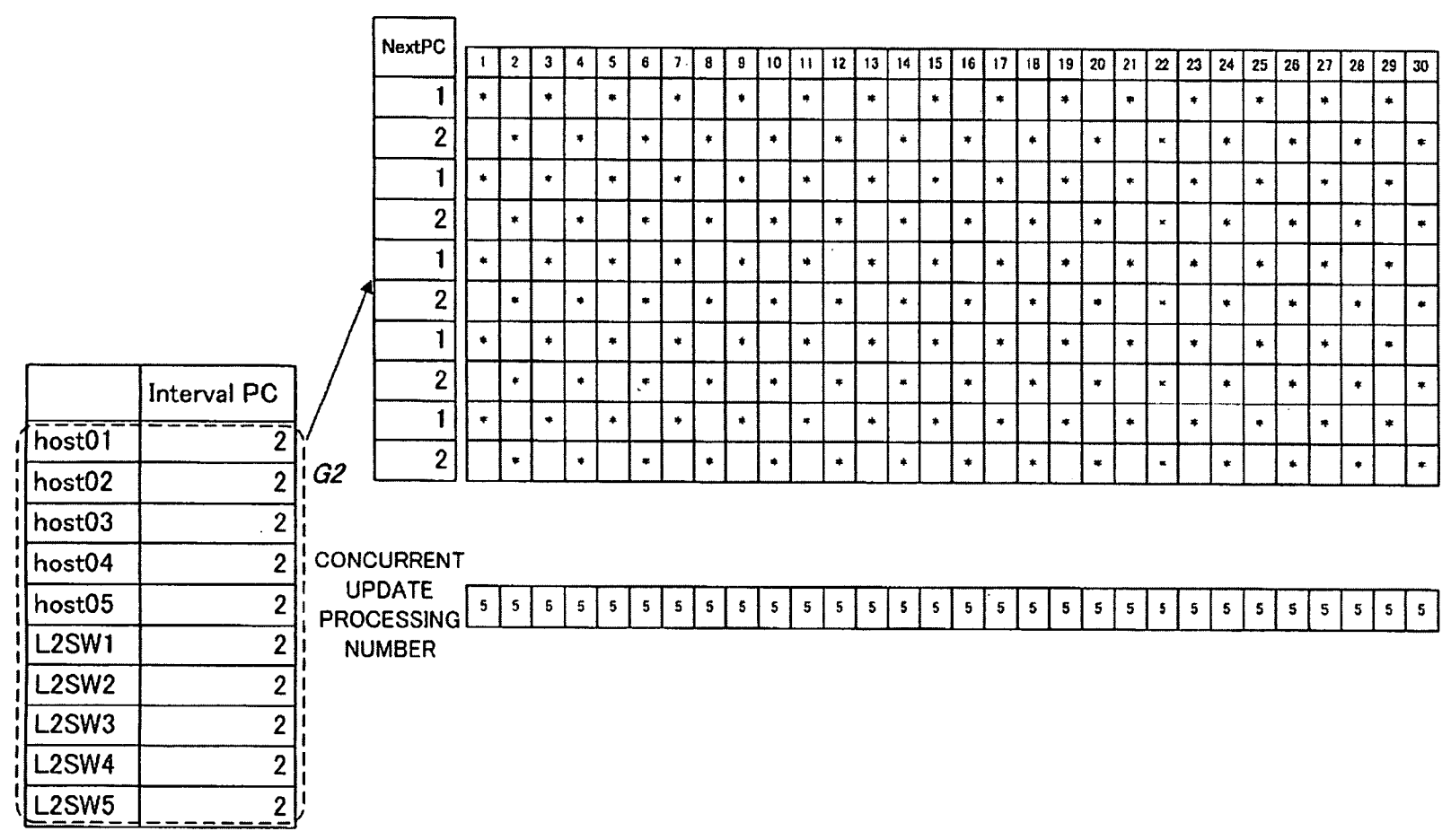

On the other hand, in the case of the present example, as shown in FIG. 9, the ten pieces of resource information are sorted into one group G2, and a collection schedule is generated collectively. As a result, as shown in FIG. 9, one collection schedule is generated the concurrent update processing numbers are as shown in the lower part of FIG. 9, and the largest value of the concurrent update processing number is within 5.

Second Example

Figure 10:
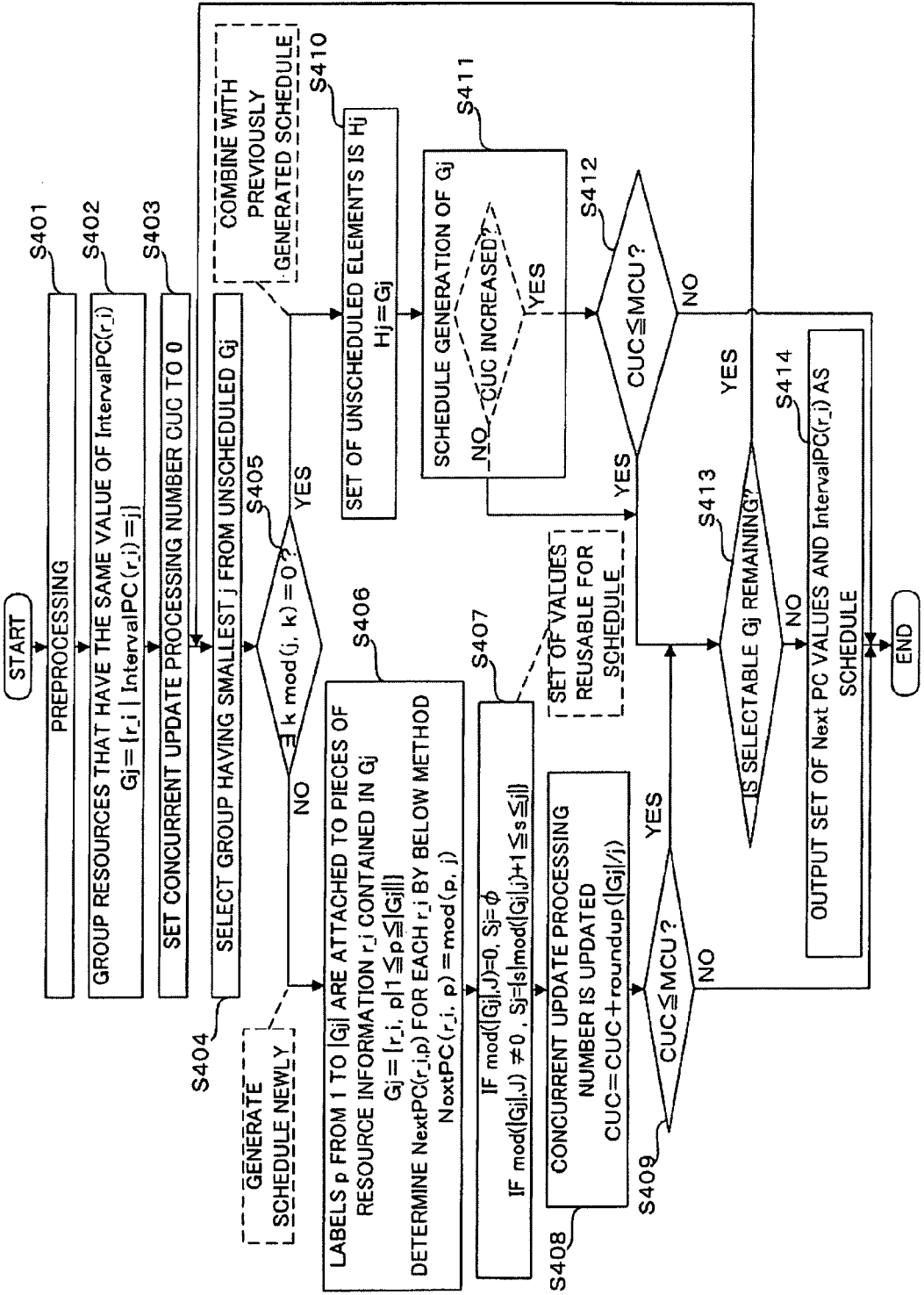
FIG. 10 is a flow chart showing a processing example of the collection schedule generating unit according to a second embodiment.

A processing example executed by the collection schedule generating unit 10 according to a present example is shown in FIG. 10. As a presupposition of the process, it is assumed that, as shown in FIG. 2, the requested freshness 410 of the resource information r_i serving as collection targets, the concurrent update processing number MCU 420, and the polling time interval PI 430 are stored in the condition storage unit 40.

[Preprocessing]

First, the collection schedule generating unit 10 carries out preprocessing similar to that of the first example, thereby obtaining IntervalPC(r_i) satisfying the information freshness request and the least common multiple LCMI (Least Common Multiple Interval) of IntervalPC(r_i) set for the resources (step S401).

Subsequently, as well as the first example, the collection schedule generating unit 10 groups the resources having the same value as IntervalPC(r_i), and the groups grouped by IntervalPC(r_i)=j are Gj (step S402).

Next, the collection schedule generating unit 10 sets a counter CUC (Concurrent Update Count) for counting the concurrent update processing number to a default 0 (step S403). Then the group having the smallest j value is selected from the groups Gj in order to determine schedules in the ascending order of the values of j of all the groups Gj (step S404). As is described later, the restriction of the concurrent update processing number MCU 420 is checked in the stage of generating the schedules of the groups. When all schedule generation processes are completed without finishing in the middle of the processes, a final schedule is output to finish the process.

After selecting one group Gj, the collection schedule generating unit 10 checks if there is any k by which j is divisible in Gk (k<j) of which schedule(s) has been determined before (step S405). In the case of mod(j,k)=0, in other words, if j is divisible by k (YES in step S405), the process advances to step S410. In other cases (NO in step S405) (including the case of Gk=φ), the process advances to step S406.

In step S406, since the update interval PC values k and j are relatively prime with respect to any of Gk for which a schedule has been determined before, Gj cannot be combined with any of the collection schedules of Gk. Also in the case of Gk=φ, in other words, when there is no group for which a schedule has been determined has not been present yet, a schedule has to be newly generated. Therefore, first, the collection schedule generating unit 10 attaches labels p from 1 to |Gj| to the pieces of resource information r_i contained in Gj.

$$Gj=\{r\_i,p | 1 \leq p \leq |Gj|\} \qquad (9)$$

Then, the collection schedule generating unit 10 determines NextPC(r_i,p) for each r_i by the next expression.

$$NextPC(r\_i,p)=mod(p,j) \qquad (10)$$

Herein, in the case of mod(|Gj|,j)≠0, the schedule includes gaps, and the group having the IntervalPC value including j as a factor can be scheduled. Then, the collection schedule generating unit 10 retains the values from mod(|Gj|,j)+1 to j which can be set as the NextPC values as a set Sj (step S407).

$$Sj=\{s | mod(|Gj|,j)+1 \leq s \leq j\} \qquad (11)$$

In the case of mod(|Gj|,j)=0, Sj is φ.

As is described later, elements which are used in later processes are removed from Sj.

Next, since the largest concurrent update processing number of the group Gj is roundup(|Gj|/j), the collection schedule generating unit 10 adds this value to the counter CUC (step S408).

$$CUC=CUC+roundup(|Gj|/j) \qquad (12)$$

Then, the counter CUC and the concurrent update processing number MCU 420 are compared with each other (step S409). When CUC is larger than MCU, it is determined that the schedule cannot be generated, and the process is finished. When CUC is equal to or smaller than MCU, the process advances to step S413.

On the other hand, in step S410, since the update interval PC value j is divisible by k with respect to the group Gk for which a schedule has been determined before, a schedule can be generated by combining Gj with the schedule of Gk. Therefore, first, the collection schedule generating unit 10 sets the set of r_i of which schedule has not been determined among the elements of Gj, in other words, r_i of which NextPC(r_i) values have not been determined as Hj and advances the process to step S411.

$$Hj=Gj \qquad (13)$$

In step S411, the process of generating the schedule of Gj by combining with another schedule is tried (details will be described later). When all the elements of Gj can be scheduled by utilizing another schedule, the counter CUC is not increased. When a new schedule is generated with respect to at least part of the elements of Gj without utilizing the other schedule, the counter CUC is increased. When the counter CUC is increased, the process advances to step S412. When the counter CUC is not increased, the process advances to step S413.

In step S412, the counter CUC and the concurrent update processing number MCU 420 are compared with each other. When CUC is larger than MCU, it is determined that the collection schedule cannot be generated, and the process is finished. When CUC is equal to or less than MCU, the process advances to step S413.

In step S413, whether any selectable Gj for which a collection schedule has not been generated yet is remaining or not is determined. When it is remaining, the process returns to step S404 and repeats the process same as the above described process. When it is not remaining, the set of the NextPC values and IntervalPC(r_i) of the resource information, which have been generated until this point, is output as a collection schedule to the collection schedule storage unit 50 (step S414), and the process is finished.

Figure 11:
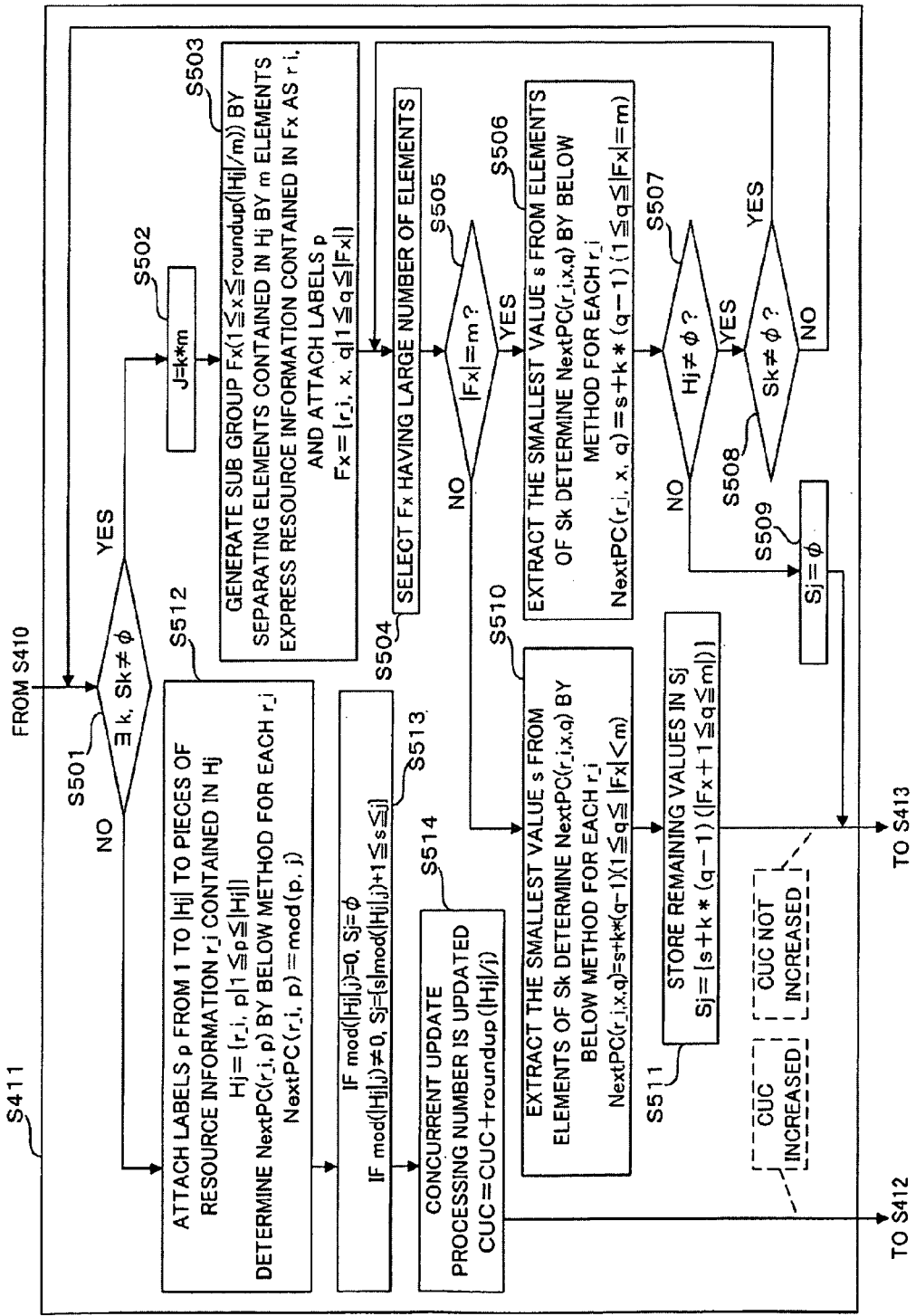
FIG. 11 is a flow chart showing a processing example of the collection schedule generating unit according to the second example.

The details of the process of step S411 are shown in FIG. 11. As a principle, Gk is selected in the ascending order of k from unexamined Gk, and whether there is allowance to add a schedule or not is checked.

First, the collection schedule generating unit 10 determines that whether there is any Sk having elements or not (step S501). When it is determined that Sk having the elements is present (NO in step S501), the process advances to step S502. When it is determined that there is no Sk having elements, in other words, Sk=φ with respect to all Gk (YES in step S501), the process advances to step S512.

When the process advances to step S502, part of the elements or all of the elements of Gj can be scheduled by combining with the schedule of Gk. Therefore, since j is divisible by k, j is expressed as j=k*m.

Subsequently, the collection schedule generating unit 10 determines the NextPC(r_i) values with respect to the resource information r_i contained in Hj by using the element of Sk as described below.

First, the collection schedule generating unit 10 generates a sub group(s) Fx(1≤x≤roundup(|Hj|/m)) by separating the elements contained in Hj by m elements, expresses the resource information contained in Fx as r_i,x, and attaches labels q from 1 to |Fx| thereto (step S503).

$$Fx=\{r\_i,x,q \mid 1 \leq q \leq |Fx|\} \quad (14)$$

Next, the collection schedule generating unit 10 selects Fx having a large number of elements (step S504). Then, the collection schedule generating unit 10 determines whether the number of elements of selected Fx is m or not (step S505). When it is determined that the number of elements of Fx is m, in other words, |Fx|=m (YES in step S505), the collection schedule generating unit 10 advances the process to step S506. When it is determined that the number of elements of Fx is other than m, in other words, |Fx|<m (NO in step S505), the collection schedule generating unit 10 advances the process to step S510.

In step S506, the collection schedule generating unit 10 determines the values of NextPC(r_i,x,q) with respect to the elements of selected Fx. Specifically, the collection schedule generating unit 10 extracts the smallest value s from the elements of Sk and sets a value smaller than j among the values obtained by adding an integral multiple of k to s as NextPC(r_i,x,q).

$$NextPC(r\_i,x,q)=s+k*(q-1)(1 \leq q \leq |Fx|=m) \quad (15)$$

The element of Sk extracted in this process is removed from Sk.

Next, the collection schedule generating unit 10 checks whether any element of Gj for which schedule is not determined is remaining or not (step S507). In the case of Hj≠φ, in other words, when it is remaining (YES in step S507), the collection schedule generating unit 10 advances the process to step S508, and, when Hj=φ, in other words, when the schedule generation process of Gj is completed (NO in step S507), the collection schedule generating unit 10 advances the process to step S509.

In step S508, the collection schedule generating unit 10 checks whether any element is remaining in Sk or not. In the case of Sk≠φ, in other words, when elements are remaining in Sk (YES in step S508), the process returns to step S504, wherein Fx having a large number of elements is selected, and the process same as the above described process is repeated. In the case of Sk=φ, in other words, when no element is remaining in Sk (NO in step S508), the process returns to step S501.

In step S509, the collection schedule generating unit 10 sets Sj=φ since the schedule of Gj has been generated by using the elements of Sk, and usable numeric values have not been newly generated as the NextPC(r_i) values. Then, the process advances to step S413.

In step S510, the collection schedule generating unit 10 determines NextPC(r_i,x,q) values in the below manner with respect to the elements of selected Fx. Herein, the sub group which satisfies |Fx|<m is at most one, and the one having a large number of elements are selected and processed first; therefore, Fx is the last sub group. First, the collection schedule generating unit 10 extracts the smallest value s from the elements of Sk. Then, the collection schedule generating unit 10 sets, as NextPC(r_i,x,q), a value smaller than j among the values obtained by adding an integral multiple of k to s.

$$NextPC(r\_i,x,q)=s+k*(q-1)(1 \leq q \leq |Fx|<m) \quad (16)$$

At this point, the values of s+k*(q−1)(|Fx|+1≤q≤m) are left unutilized even though they can be set as NextPC. When these values are used, the group(s) having the IntervalPC value including j as a factor may be scheduled. Therefore, the collection schedule generating unit 10 retains these values as Sj (step S511).

$$Sj=\{s+k*(q-1)(|Fx|+1 \leq q \leq m)\} \quad (17)$$

Then, Hj becomes equal to φ, and the schedule for Gj is completed; therefore, the process advances to step S413.

In step S512, since examination of all the schedules of Gk which can be combined has been finished, a schedule is generated with respect to the remaining elements Hj. First, the collection schedule generating unit 10 attaches labels p from 1 to |Hj| to the pieces of resource information r_i contained in Hj.

$$Hj=\{r\_i,p \mid 1 \leq p \leq |Hj|\} \quad (18)$$

Next, the collection schedule generating unit 10 determines NextPC(r_i,p) with respect to each of r_i by the below expression.

$$NextPC(r\_i,p)=mod(p,j) \quad (19)$$

Herein, in the case of mod(|Hj|,j)≠0, the schedule includes gaps, and the group having the IntervalPC value including j as a factor may be scheduled. Therefore, the collection schedule generating unit 10 retains the values from mod(|Hj|,j)+1 to j which can be set as the NextPC values as a set Sj (step S513).

$$Sj=\{s \mid mod(|Hj|,j)+1 \leq s \leq j\} \quad (20)$$

In the case of mod(|Hj|,j)=0, Sj is equal to φ.

The elements utilized in later processes are extracted from Sj.

Next, since the largest concurrent update processing number of the group Gj becomes roundup(|Hj|/j), the collection schedule generating unit 10 adds this value to the counter CUC (step S514). Then, the process advances to step S412.

$$CUC = CUC + \text{roundup}(|Hj|/j) \quad (21)$$

Next an example of the case in which a better schedule is generated by the present second example compared with the first example will be shown.

Figure 12:
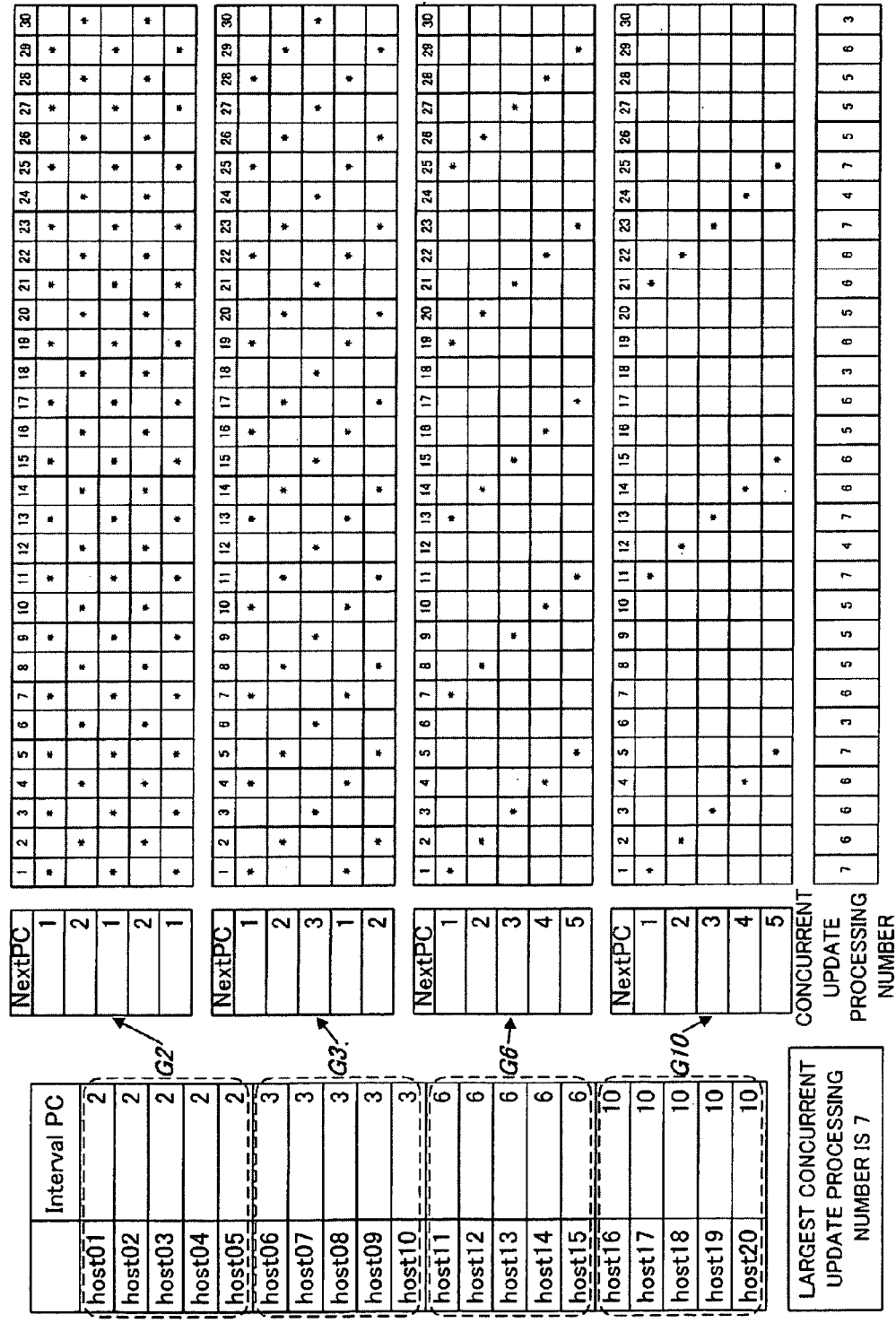
FIG. 12 is a diagram showing a still another example of the collection schedule generated by the collection schedule generating unit according to the first example.

Herein, the situation in which resource information has the update interval PC values of 2, 3, 6, and 10, wherein the information of each value includes five pieces of information, is considered. When the collection schedule of the resource information in this situation is generated by applying the schedule generating method of the first example, the resource information having the same value as the update interval PC values is grouped into groups G2, G3, G6, and G10, and schedules for the groups as shown in FIG. 12 are generated, respectively. As a result, the largest concurrent update processing number becomes 7. If a collection process is carried out without scheduling, the largest concurrent update processing number becomes 20 in the worst case; therefore, the schedules generated in the first example are sufficiently practical. However, since the update interval PC values are not relatively prime or prime numbers, optimal schedules are not always obtained by the schedule generating method of the first example. In this case, when the present second example is employed, more optimal schedules are generated. Hereinafter, the process of generating the collection schedule of the resource information under this situation by applying the schedule generating method of the second example will be explained.

Figure 13:
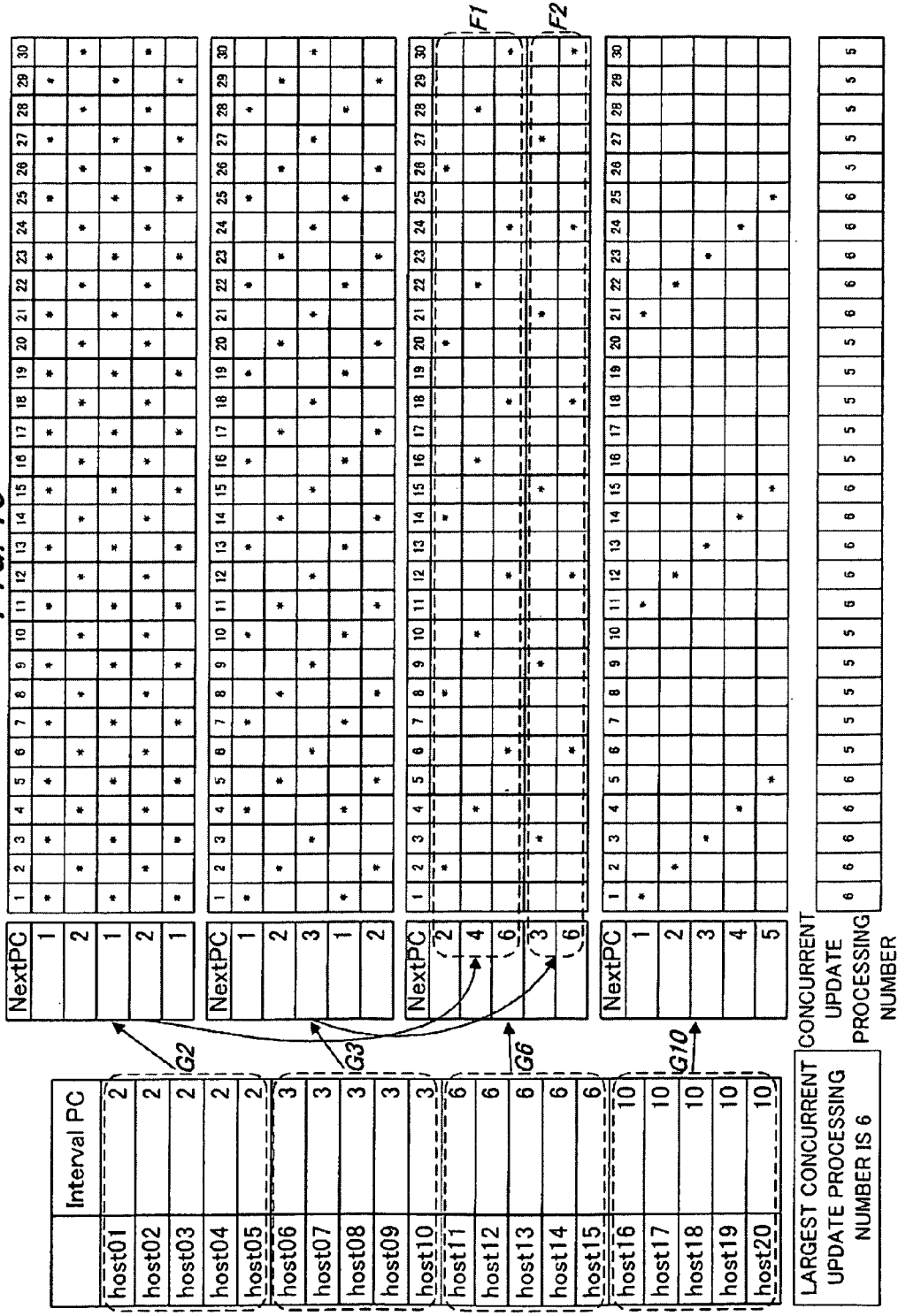
FIG. 13 is a diagram showing an example of the collection schedule generated by the collection schedule generating unit according to the second example.

As shown in FIG. 13, as well as the first example, the collection schedule generating unit 10 groups the resources into four groups G2, G3, G6, and G10 for the same update interval PC values, respectively. Next, the collection schedule generating unit 10 generates a schedule in each of the groups from G2 having the smallest update interval PC value. In the case of G2, there is no group for which a collection schedule has been generated previously; therefore, the collection schedule is generated in accordance with the same procedure as the first example. The result is shown in FIG. 13. In the generated schedule, the largest value of the concurrent update processing number is 3; however, the part at which the concurrent update processing number is 2 is also present. In other words, the schedule has allowance, and another resource having 2 as the update interval PC value can be scheduled by setting a next update interval value 2. Therefore, the collection schedule generating unit 10 stores the next update interval value 2, which can be set, in the set of S2.

Next, the collection schedule generating unit 10 generates a schedule in a group with respect to G3. At the point when the schedule of G3 is to be generated, the schedule of G2 has already been generated. However, since mod(3,2) is not equal to 0, a new schedule is generated also for G3 by the same procedure as the first example. The result is shown in FIG. 13. The largest concurrent update processing number of the generated schedule is 2, and the schedule has allowance. Another resource having 3 as the update interval PC value can be scheduled by setting a next update interval value 3. Therefore, the collection schedule generating unit 10 stores the next update interval value 3, which can be set, in the set of S3.

Next, the collection schedule generating unit 10 generates a schedule in the group with respect to G6. At this point, the schedules of G2 and G3 have been completed, and mod(6,2) is equal to 0; therefore, a method of combining it with the collection schedule of G2 is sought. Since S2 is not equal to φ, the allowance of the collection schedule of G2 can be utilized.

First, the collection schedule generating unit 10 considers G6 is equal to H6. Since j is equal to 6 and k is equal to 2, in is equal to 3. The collection schedule generating unit 10 divides the elements of H6 by three to generate two sub groups F1 and F2. In the case of |F1|=3 and |F2|=2, first, the collection schedule generating unit 10 selects |F1|. Then, in S2, only one value 2 is stored by the previous process. Therefore, the collection schedule 10 utilizes this and sets next update PC values for the elements of F1 as shown in FIG. 13. In this process, the values 2, 4, and 6 are set for the three elements of F1, respectively. Through this operation, S2 becomes equal to φ; therefore, the other Gk is checked by the collection schedule generating unit 10. At this point, the number of elements of H6 has been reduced from 5 to 2.

Then, since mod(6,3) is equal to 0, a combination with the schedule of G3 is also conceivable. S3 is also S3≠φ. Since j is equal to 6 and k is equal to 3, in is equal to 2. The collection schedule generating unit 10 generates only one sub group F2 wherein the number of elements of H6 is divided by two. Since only one value 3 has been stored in S3 by the previous process, the collection schedule generating unit 10 sets the next update PC values of the elements of F2 3 and 6, respectively, by utilizing the value as shown in FIG. 13. Through this operation, H6 becomes equal to φ, and the schedule has been determined for all the elements of G6. The collection schedule generating unit 10 considers that S6 is equal to φ and finishes the schedule generating process for G6. The concurrent update processing number is not increased in the schedule generating process for G6.

Lastly, a schedule in the groups is generated for G10. Although mod(10,2) is obtained, S2 is equal to φ; therefore, the collection schedule cannot be combined. Therefore, the collection schedule generating unit 10 generates a schedule in accordance with the procedure same as the first example. The result is shown in FIG. 13.

In the schedule of the entirety completed in the above process, the largest concurrent update processing number is 6, which is a smaller value compared with the schedule according to the first example shown in FIG. 12. In the case of this example, theoretically, it can be proved that the largest concurrent update processing number cannot be reduced to 6 or less; therefore, in this case, the optimal schedule was generated.

The embodiment and examples of the present invention have been explained above; however, the present invention is not limited to the above examples, and various other addition and modifications can be made. For example, in the above described example, the concurrent update processing number that has to be satisfied is provided as a restriction. If the largest value of the sum of the concurrent update processing numbers of the collection schedules generated for each group does not satisfy the restriction, it is determined that the schedule cannot be generated, and the schedule is not output. However, it is possible not to take the restriction of the concurrent update processing number into consideration upon generation of the collection schedule.

Moreover, as a matter of course, the functions that the resource information collecting devices and the collection schedule generating device of the present invention have can be realized in terms of hardware or realized by computers and programs. The programs are provided in the manner that they are recorded in computer readable media such as magnetic disks or semiconductor memories, and the programs are read by the computers when the computers are turned on, and control the operations of the computers, thereby causing the computers to function as the collection schedule generating unit 10, the information collecting unit 20, and the search processing unit 30 of the above described embodiment and causing the computers to execute the processes shown in FIG. 5, FIG. 6, FIG. 7, FIG. 10, and FIG. 11.

INDUSTRIAL APPLICABILITY

The present invention can be applied for uses such as an integrated monitoring system which monitors the configurations and state of a distributed system. The present invention can be also applied to a use that improves accuracy and reliability of autonomous operation management in management middleware for autonomous operation which establishes autonomy of manually-operated system operation management.

The invention claimed is:

1. A resource information collecting device of periodically collecting plural pieces of resource information by polling, the resource information collecting device comprising:
hardware including a processor;
a grouping unit implemented at least by the hardware and grouping the pieces of resource information, which are periodically collected over a plurality of pollings conducted at periodic time intervals, into groups, each group comprising the pieces of resource information having a same interval for collection;
a collection schedule generating unit implemented at least by the hardware and generating a collection schedule for each of the groups and for collecting the resource information belonging to each group;
a collection schedule storage unit implemented at least by the hardware and storing the collection schedule generated by the collection schedule generating unit;
a resource information collecting unit implemented at least by the hardware and collecting the pieces of resource information in accordance with the collection schedule stored by the collection schedule storage unit; and
a resource information storage unit implemented at least by the hardware and storing the pieces of resource information collected by the resource information collecting unit,
wherein the collection schedule generating unit determines whether a largest value of a number of pieces of resource information collected in any of the pollings is exceeding a predetermined number or not when the resource information are collected in accordance with the generated collection schedule, and stops generation of the collection schedule when the largest number is determined to be exceeding the predetermined number,
wherein, the collection schedule generating unit generates a different collection schedule for each piece of information such that the number of pieces of resource information collected in any of the pollings does not exceed the predetermined number, and such that at any of the pollings just some and not all the pieces of resource information are collected.

2. The resource information collecting device according to claim 1, wherein
the pieces of resource information are collected by the polling that is activated at every unit time, and
a value of the number of activation of polling corresponding to a time interval of periodically collecting the pieces of resource information is a prime number.

3. The resource information collecting device according to claim 1, comprising a condition input unit inputting a collection schedule generation condition including a range of a time interval of collection requested for each piece of resource information target; and
a setting unit setting a time interval of periodically collecting the pieces of resource information so as to satisfy the generation condition input by the condition input unit.

4. A resource information collecting method of periodically collecting plural pieces of resource information by polling, the resource information collecting method comprising:
grouping the pieces of resource information, which are periodically collected over a plurality of pollings conducted at periodic time intervals, into groups, each group comprising pieces of resource information having a same interval for collection;
generating a collection schedule for each of the groups and for collecting the resource information belonging to each group;
collecting and storing the pieces of resource information in accordance with the collection schedule; and
wherein generating the collection schedule comprises:
determining whether a largest value of a number of pieces of resource information collected in any of the pollings is exceeding a predetermined number or not when the resource information are collected in accordance with the generated collection schedule, and stops generation of the collection schedule when the largest number is determined to be exceeding the predetermined number,
wherein, a different collection schedule is generated for each piece of information such that the number of pieces of resource information collected in any of the pollings does not exceed the redetermined number and such that at any of the pollings just some and not all the pieces of resource information are collected.

5. A non-transitory recording medium storing a program of causing a computer, which periodically collects plural pieces of resource information by polling, to execute a method comprising:
grouping the pieces of resource information, which are periodically collected over a plurality of pollings conducted at periodic time intervals, into groups, each group comprising the pieces of resource information having a same interval for collection;
generating a collection schedule for each of the groups and for collecting the resource information belonging to each group;
collecting and storing the pieces of resource information in accordance with the collection schedule; and
wherein generating the collection schedule comprises:
determining whether a largest value of a number of pieces of resource information collected in any of the pollings is exceeding a predetermined number or not when the resource information are collected in accordance with the generated collection schedule, and stops generation of the collection schedule when the largest number is determined to be exceeding the predetermined number,
wherein, a different collection schedule is generated for each piece of information such that the number of pieces of resource information collected in any of the pollings does not exceed the predetermined number, and such that at any of the pollings just some and not all the pieces of resource information are collected.

* * * * *